United States Patent [19]
Witzig et al.

[11] 3,741,674
[45] June 26, 1973

[54] RADIAL ARM BORING MACHINE

[75] Inventors: Emil Karl Witzig, Leouberg; Rudolf Frank, Ludwigsburg; Willi Klein, Denkendorf, all of Germany

[73] Assignees: Emil Karl Witzig, Stuttgart-Weilimdorf; Rudolf Frank, Ludwigsburg, both of Germany

[22] Filed: Sept. 2, 1971

[21] Appl. No.: 177,310

[30] Foreign Application Priority Data
Sept. 5, 1970 Germany............... P 20 44 150.3

[52] U.S. Cl................. 408/237, 83/471.3, 308/3 A
[51] Int. Cl...................... B23b 39/12, B23b 47/00
[58] Field of Search........................ 408/236, 237; 143/6 A, 6 B, 6 C, 6 D, 47 D; 144/134 B; 308/3 A; 90/16; 83/471.3

[56] References Cited
UNITED STATES PATENTS
2,353,088  7/1944  Schutz............................... 143/6 A
2,525,712  10/1950  Neighbour....................... 143/47 D FOREIGN PATENTS OR APPLICATIONS
983,223  3/1951  France............................... 408/237

Primary Examiner—Francis S. Husar
Attorney—Robert D. Flynn et al.

[57] ABSTRACT

To locate the length of the extension arm of a radial arm boring machine in position, a clamping arrangement is provided which acts on the arm from above, the clamping arrangement including a cam, preferably a wedge member which acts against another wedge element pressing the arm against its guide parts secured to the upstanding column of the boring machine. The clamping parts may be hydraulically locked in position. Preferably, the arm is guided on the column by rollers secured at end surfaces of a housing, the shafts of the rollers being adjustable, adjustment preferably being effected by a screw or spindle arrangement.

12 Claims, 4 Drawing Figures

RADIAL ARM BORING MACHINE

CROSS REFERENCE TO RELATED APPLICATION

"RADIAL BORING MACHINE WITH EXTENDING, ADJUSTABLE BORING HEAD" U.S. Ser. No. 177,381 Filed: Sept. 2, 1971.

The present invention relates to a radial arm machine tool and more particularly to a radial arm boring machine, in which an extending arm carries a boring spindle, connected to an upstanding column, and is provided with means to clamp the arm in position with respect to the column.

Radial arm boring machines customarily have a vertical column which can be adjusted in height, carrying, at its end, a connection assembly interconnecting the column and the radially extending arm. The housing itself is preferably formed with a pair of walls, each having pairs of rollers located thereon, axially spaced from each other, which engage the radially extending arm which is preferably formed as a profiled, shaped member, for example having inclined guide surfaces. The rollers are arranged above and below the extending arm to guide the arm at four points, each point being adjacent the edge of the interconnection assembly. Radial boring machines of this type require a high degree of stability and rigidity of the construction is of prime importance, since even slight deflection of the radial arm, in vertical, or lateral direction under influences of the reactive force due to machining causes bore holes to become unround and may lead to damage of the machine tool itself. It is thus important that the guiding and holding arrangement of the extending arm within the end assembly connected to the column be rigid, provide for reliable guidance, but additionally permit ready movement of the arm so that the position of the machine tool at the end thereof can be shifted as desired. Thus, the arm, and the interconnection must satisfy two inherently conflicting requirements: on the one hand it must provide, during operation, an absolutely rigid, fixed interconnection, without play between the machine tool head and the supporting column (and hence the machine tool base) and, on the other, when not being operated but when being set up for machining of parts, the extension arm must be easily movable.

It is an object of the present invention to provide a radial arm machine tool, and particularly a radial arm boring machine which permits exact guidance of the arm, without play, and further can easily and securely be locked in position.

SUBJECT MATTER OF THE PRESENT INVENTION

Briefly, an interconnection arrangement is provided between the support column and the extending arm which includes guide means guiding the movement of the arm while supporting the arm and, adjacent the guide means, a camming arrangement located above the arm and having counter-bearing surface engaging the column while being capable of bearing against the arm is provided; and means to provide a moving force to the camming arrangement to clamp the arm in position and lock it to the column.

In accordance with a feature of the invention, the clamping means includes a longitudinally split block which is engaged by a wedge, the split of the block matching with the plane of symmetry of a profiled surface on the extension arm.

In accordance with another feature of the invention, the guide means includes a plurality of rollers, in two groups, one group located above and the other below the arm, the rollers being secured to the column (or indirectly over a housing) by an adjustable bearing block, the position of which can be changed for example by a screw and spindle adjustment to provide for just the right amount of looseness to permit ready shifting of the arm as it rolls over the rollers, while avoiding all play. The rollers themselves are held in bearing blocks which surround the rollers, so that the shafts of the rollers extend therethrough, from both sides, providing for improved support without danger of deflection of the rollers, under the reaction force of machine tool operation.

Locating the rollers in bearing blocks supporting the roller shafts at both ends thereof substantially increases the stability with respect to arrangements in which rollers are located freely on single-suspension shafts. By securing the rollers to shafts, and supporting the shafts at both sides of the rollers, the radially extending arm is guided with much better precision and deflection of the radial arm, under the counter-force during boring operation is essentially reduced. Adjustment of the rollers permits locating the radially extending arm on the column essentially without play. The securing wedge acts from the top downwardly, that is, counter the direction of the reaction force due to operation of the boring machine. The total forces acting on the clamping arrangement thus are not only the clamping force, but also the counter-force, so that the reaction force of machine operation additionally contributes to securing the arm in position on the column, and further counteracting shifting of the arm under the reactive force of the machine in operation. Locating the securing wedge immediately behind the upper forward roller (with respect to the machine tool) provides for particularly advantageous clamping.

The invention will be described by way of example with reference to the accompanying drawings, wherein.

Figure 2:
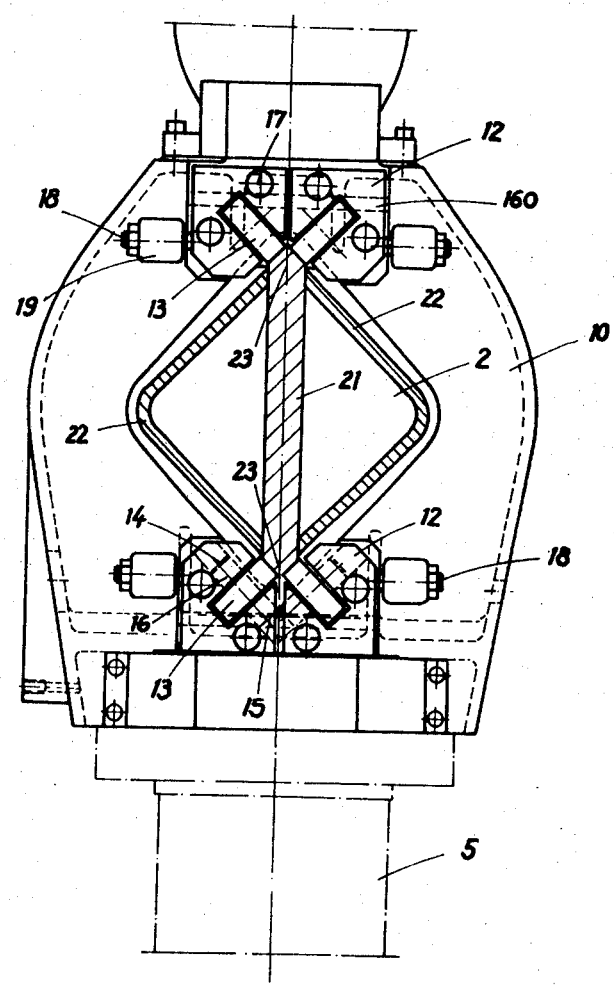
FIG. 2 is an axial sectional view of the interconnection, the arm itself being shown in cross section.

The radial boring machine has a machining table 7, and a base socket 6 secured thereto within which a vertical column is located, shielded by a bellows 4. The radial arm 2 carries a machine tool head, in this case a boring head, having a bore spindle 20. The feed arrangement is not shown in detail since it is well known in the art. The arm 2 is connected to the column 5 (FIGS. 2, 3) within bellows 4 by an interconnection arrangement 3, which permits radial shifting of the arm 2, so that the spindle 20 can be located at any radial distance from the column 5 within socket 6.

Figure 3:
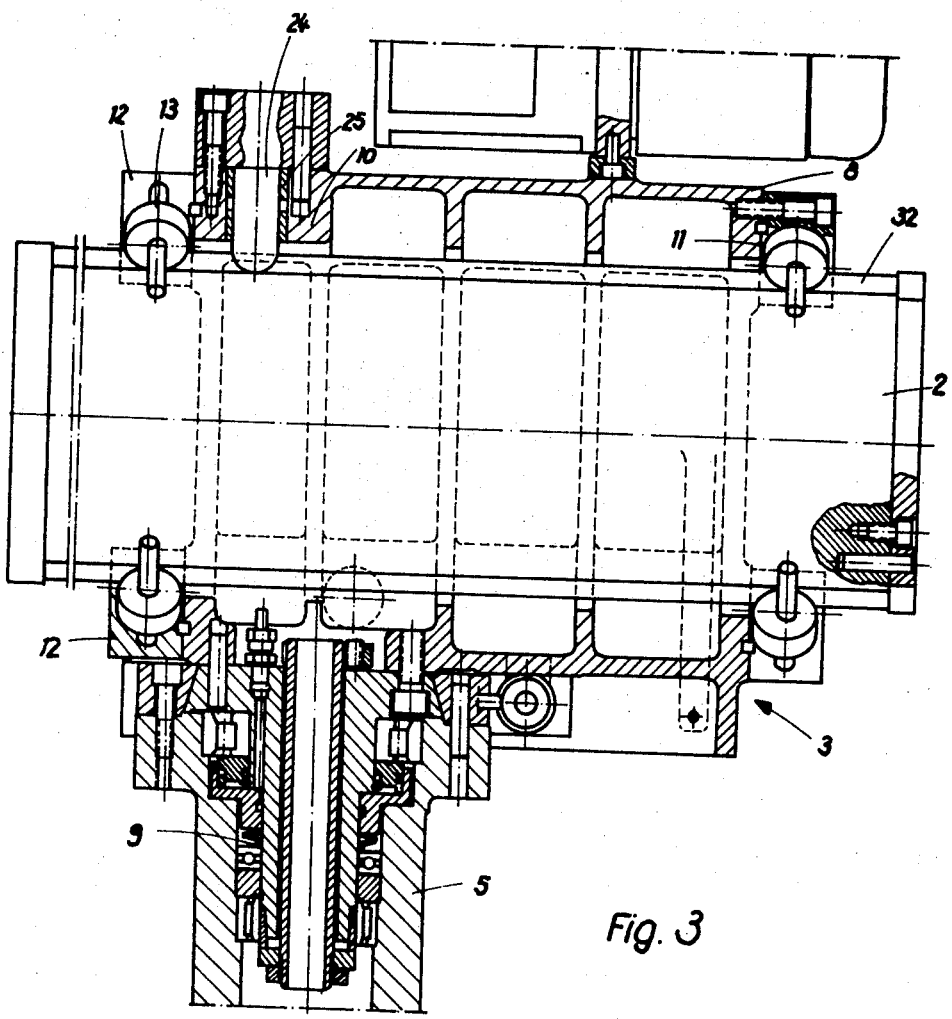
FIG. 3 is a side view of the interconnection arrangement of the arm of the machine of FIG. 1.

The interconnection arrangement 3 is best seen in FIG. 3; it is in the form of a generally elongated housing 8, having a cylindrical bearing pin 9 which extends within the hollow of column 5, to be journalled therein. For a description of the details of the bearing between pin 9 and column 5, reference is made to the above referred to cross reference application. The vertical end walls 10, 11 of housing 8 have four bearing blocks 12 for rollers 13 secured thereto. Each one of the rollers 13 is rotatable about a shaft 16 which extends at both sides seen at 14, 15 from roller 13 into the bearing blocks.

Figure 1:
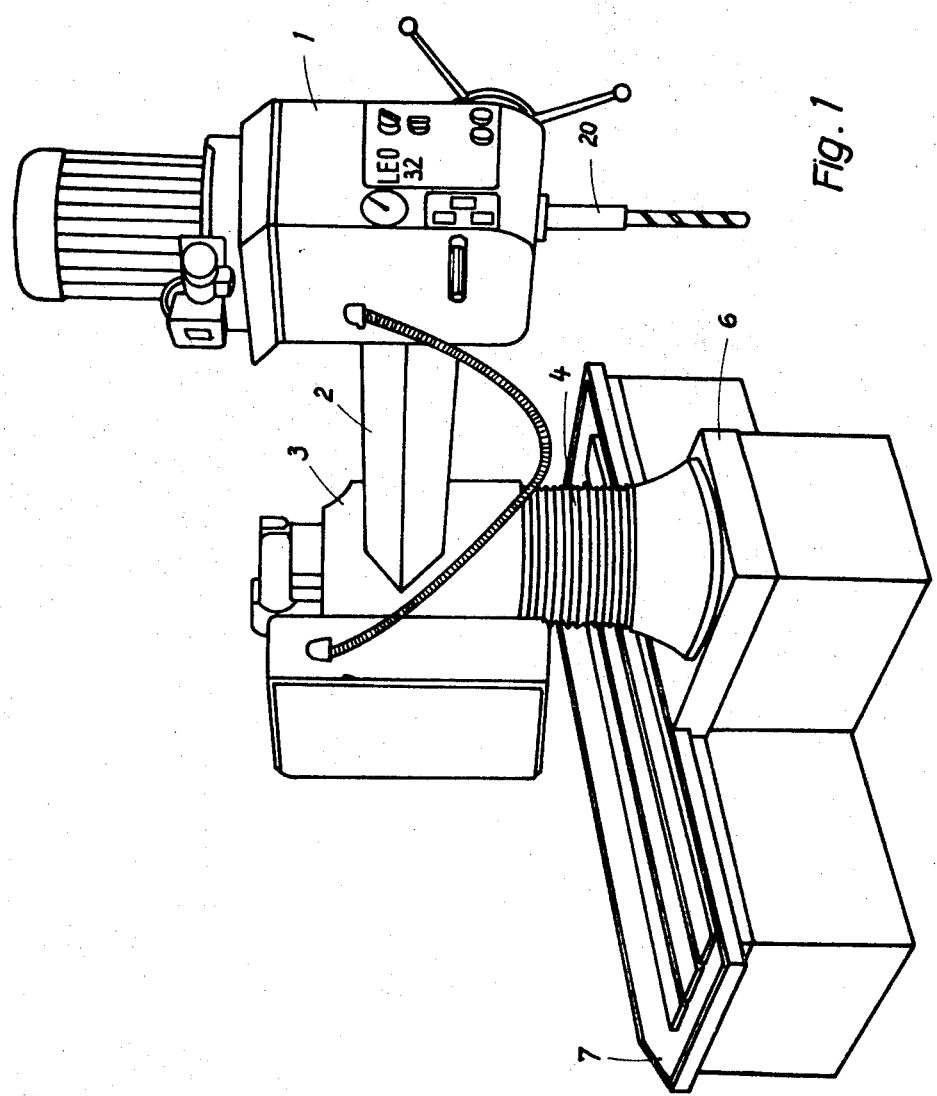
FIG. 1 is a perspective schematic view of the boring machine illustrating the major portions thereof, the boring head being shifted approximately 180° from its normal operating position to facilitate illustration.

Bearing blocks 12 are located in horizontal grooves 160, to be horizontally adjustable by means of cylinder screws 17. Adjustment screws 18 are located laterally of the bearing blocks 12, the adjustment screws 18 being screwed into bearing eyes 19, rigidly connected with the end wall 10 (or 11, respectively). Turning the adjustment screws 18 enables adjustment of rollers 13 with respect to the extension arm 2 to provide for adjustment of the guidance of the extension arms, and thus of the boring spindle 20 (FIG. 1).

Extension arm 2 itself is formed as a profiled element 21, to which a pair of edge-located angles are welded in order to increase the lateral stiffness of the arm. The resulting track member 21 then will have a pair of wedge-shaped, inclined guide surfaces 23, each one co-operating with a pair of rollers 13, one at the forward and one at the rear end wall 10, or 11, respectively, of the attachment unit 3.

Figure 4:
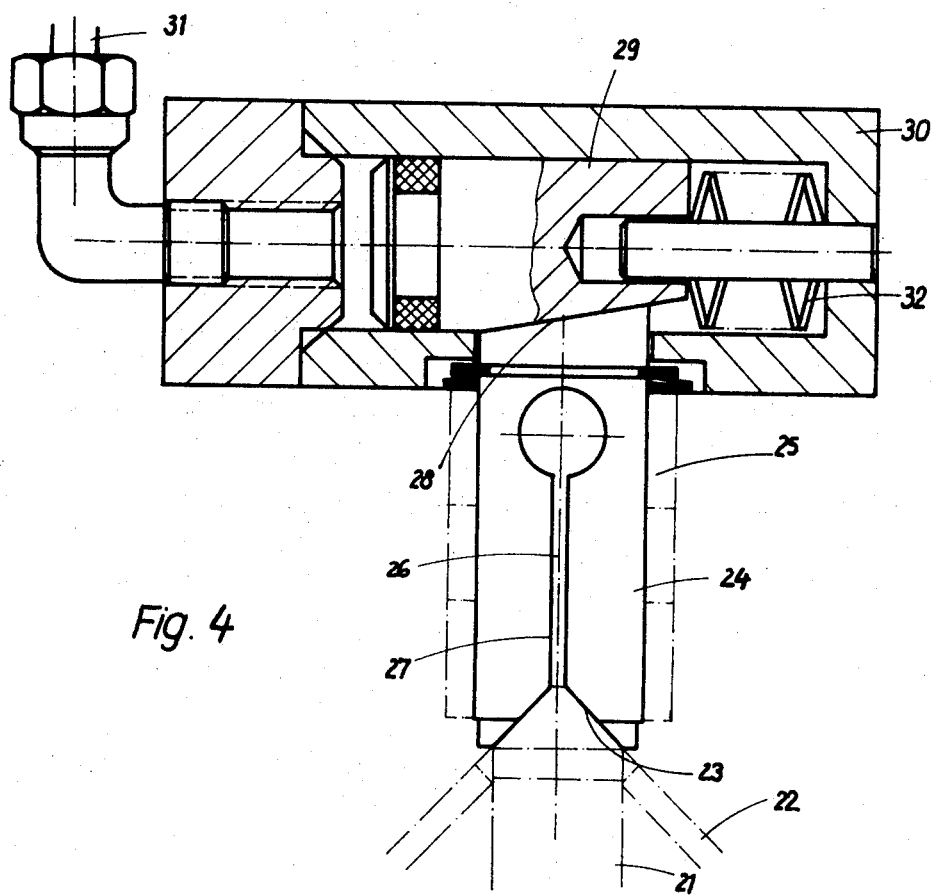
FIG. 4 is a partial sectional view of the clamping arrangement to clamp the arm in position, to an enlarged scale, and with parts not necessary for an understanding of this feature being omitted.

The arm is secured in position by means of a clamping arrangement, best seen in FIG. 4. A clamping wedge 24, located immediately behind the forward roller bearings 12, with respect to the machine tool head 1, acts on the upper side of the profiled track member 21 of arm 2. The clamping or camming wedge 24 is longitudinally slidable within a sleeve-like housing 25, suitably screwed or otherwise secured to column 8, or a housing portion thereof, the attachment not being shown in detail since any suitable interconnection may be used. The wedge portion 24 is formed with a central slit 27, having a central plane which matches the plane of symmetry 26 of the profiled member 21 of arm 2. Thus, any radial play of the arm with respect to the guide rollers is compensated. The surfaces of wedge 24 facing surfaces 23 match surfaces 23 (see FIG. 4). The wedge 24 itself is clamped against the wedge-shaped guide surfaces 23 of arm 2 by means of an inclined surface 28 which engages a wedge element 29, slidable within a hydraulic cylinder 30. Wedge element 29 simultaneously forms the piston within the cylinder, hydraulic fluid under pressure being applied through a pressure line 31. Upon application of hydraulic pressure to cylinder 30, the piston 29 will move to the right (FIG. 4) pressing the wedge element 24 downwardly to lock against surfaces 23. Upon release of pressure, a reset spring 32 moves the wedge-piston 29 to the left, thus freeing wedge 24 to move upwardly and slide freely. The angle of the inclined surface 28 and of the wedge-cylinder 29 is so selected, with respect to the strength of spring 32, that spring 32 can return wedge 29 to rest position, at the left, and to release the clamp 24.

If desired, springs may be located in the housing and apply a small upward lifting force to wedge element 24 to clear from surface 23. As can be seen, reaction forces due to machine operation will act upwardly, that is, counter the direction of the force being transmitted by pressure fluid 31, so that the forces acting on surface 23 will add, to provide for secure and reliable clamping of the arm in position.

The present invention has been described particularly in connection with a boring machine. Various changes and modifications may be made to adapt the inventive concept to other machines and machine tools.

We claim:

1. Machine tool, particularly boring machine, having a radially extending arm (2), comprising
    a support column (5);
    said arm (2) being movably interconnected with the support column to permit longitudinal movement of the arm with respect to the column;
    guide means on the column at either side thereof and spaced along the arm and guiding the movement of the arm while supporting the arm;
    and clamping means locking the arm in position on the column, said clamping means comprising
    a clamping wedge movably located above the arm to bear downwardly against the arm, the wedge having an inclined engaging surface fitting against the arm to clamp the arm to the column, and being positioned adjacent the guide means closest to the extending end of the arm and having a counter bearing surface bearing against the column;
    and means (29, 30, 31) applying a moving force to said clamping means to lock the arm to the column.

2. Machine tool according to claim 1, wherein the clamping wedge comprises a camming surface;
    a shiftable camming element (29) is provided;
    and the means applying the moving force are arranged to provide a shifting force to the camming element (29).

3. Machine tool according to claim 1, wherein the clamping means comprises a camming element (29).

4. Machine tool according to claim 3, including a housing (30) for the camming element (29);
    and wherein the means applying the moving force comprises a hydraulic pressure source (31) supplying hydraulic fluid under pressure between the camming element (29) and the housing (30), the camming element (29) forming a piston and the housing (30) forming a cylinder, to move the camming element relative to the wedge (24) and provide a clamping force against the arm.

5. Machine tool according to claim 1, wherein the radially extending arm has an upper profiled surface (22) which, in cross section, is symmetrical, said surface having a peak region;
    and said clamping wedge (24) is movable in a vertical plane and has a slit (27) formed therein located in the plane of symmetry (26) of the profiled surface, the wedge element engaging the profiled surface at both sides of the peak.

6. Machine tool according to claim 5, comprising a sleeve-like housing (25) surrounding the clamp wedge (24) to slidably retain the clamp wedge therein, spreading of the wedge (24) when the peak bears against the wedge surfaces, due to the slit (27) in the wedge, being restrained by said sleeve-like housing (25).

7. Machine tool according to claim 1, wherein the guide means includes a housing (30) and the clamping means further comprises a movable operating cam (29) movable within the housing and having an inclined surface;

and the wedge (24) has an inclined side bearing against the inclined surface of the cam (29).

8. Machine tool according to claim 1, wherein the guide means movably interconnecting the arm (2) with the support column (5) comprises a housing (10) secured to the support column (5), a plurality of roller means (13) located in the housing and divided into two groups, one group being located below and the other above the arm, the rollers of said groups being located at opposite sides of the support column;

shafts (16) for the roller means extending through the rollers (13);

and bearing means (12) securing the shafts at both sides of the roller means to the housing (10), the bearing means being adjustably mounted within the housing to permit alignment thereof and hence of the roller means with respect to the arm.

9. Machine tool according to claim 8, wherein the radially extending arm has an upper profiled surface which, in cross section, has a pair of laterally inclined symmetrically located surfaces (22), the surfaces having a peak; the clamp wedge (24) has a slit (27) formed therein located in the plane of symmetry of the profiled surface, with respect to the peak and is formed with engagement surfaces matching the profiled, inclined surfaces of the arm to clamp the arm with the wedge as an intermediate to the column at a position immediately adjacent the roller (13) of the upper group of rollers closest to the end of the arm projecting away from the column.

10. Machine tool according to claim 9, comprising a sleeve-like housing (25) surrounding the clamp wedge (24) to slidably retain the clamp wedge therein, spreading of the wedge (24) when the peak bears against the wedge surfaces, due to the slit (27) in the wedge being restrained by said sleeve-like housing (25).

11. Machine tool according to claim 1, wherein the clamping means is located between the guide means (13) closest to the end of the arm (2) projecting away from the column (5), and the column (5).

12. Machine tool according to claim 10, wherein the clamping means is located between the roller (13) closest to the end of the arm (2) projecting away from the column (5), and the column (5).

* * * * *